Dec. 24, 1935.                A. R. THOMPSON                    2,025,316
                             ROTARY DISPENSING BIN
                         Filed Jan. 23, 1932          2 Sheets-Sheet 1
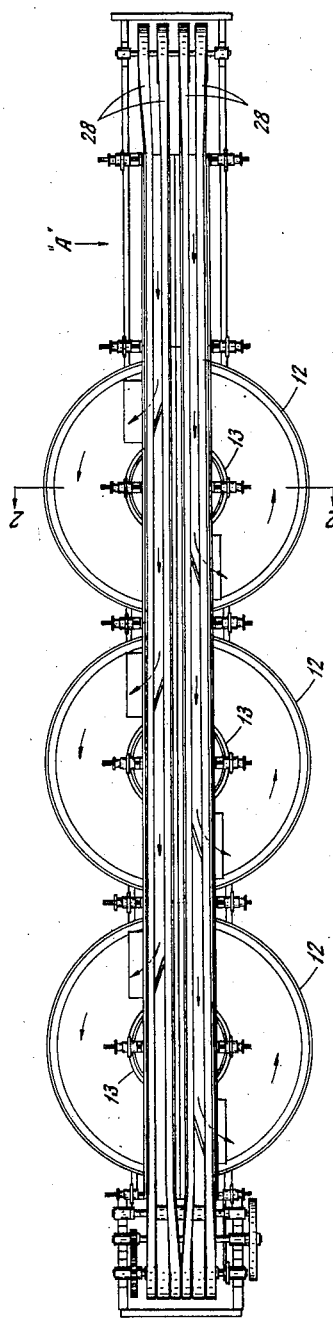
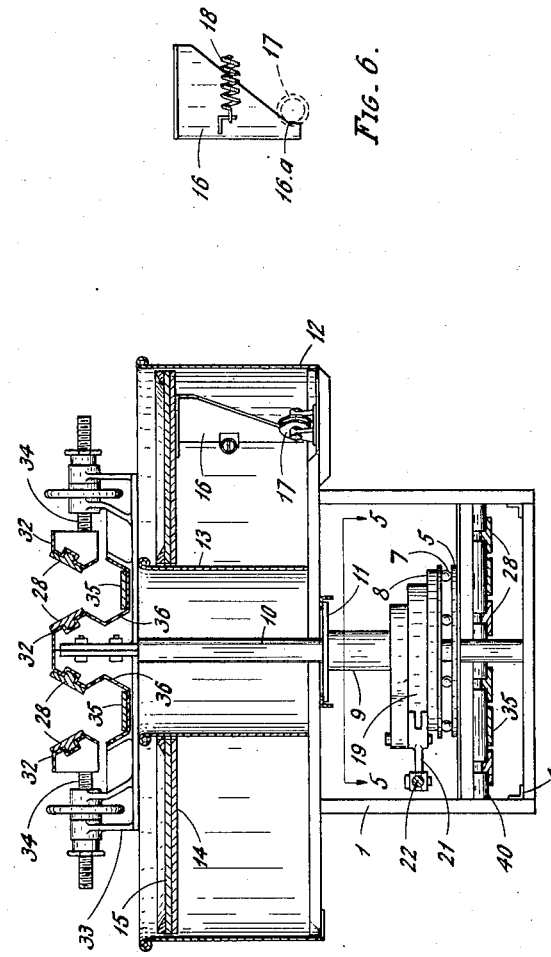
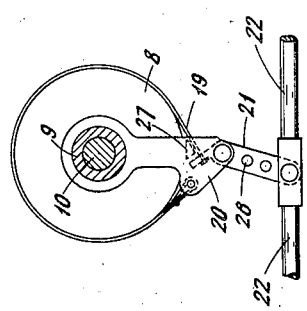
INVENTOR.
Albert. R. Thompson.
BY
Philip A. Minnis
ATTORNEY.

Dec. 24, 1935.  A. R. THOMPSON  2,025,316

ROTARY DISPENSING BIN

Filed Jan. 23, 1932  2 Sheets-Sheet 2

INVENTOR.
Albert R. Thompson.
BY Philip A. Minnis
ATTORNEY.

Patented Dec. 24, 1935

2,025,316

UNITED STATES PATENT OFFICE 2,025,316

ROTARY DISPENSING BIN

Albert R. Thompson, San Jose, Calif., assignor to Food Machinery Corporation, San Jose, Calif., a corporation of Delaware Application January 23, 1932, Serial No. 588,371

12 Claims. (Cl. 226—129)

This invention relates to fruit handling equipment, and has particular reference to the construction and operation of rotary bins such as are commonly used in conjunction with fruit sizers to receive the fruit therefrom and dispense it to attendants for packing into boxes or other containers for shipment.

Bins of this character are ordinarily provided with yieldable or floating bottoms which are depressible by the weight of fruit thereon, whereby the volume of a bin is automatically varied in accordance with the quantity of fruit deposited therein, and the fruit maintained at a given level irrespective of variations in the quantity of fruit contained in the bin.

A serious objection to the use of such bins as heretofore constructed has been due to the character of the guiding and supporting means for the bin bottom, which has customarily consisted of a vertical guide shaft projecting upwardly through a centrally disposed bearing provided in the bin bottom, together with means for yieldably supporting the bottom in elevated position.

By reason of irregularities in the delivery or removal of fruit it not infrequently happens that the fruit becomes unevenly distributed over the bin bottom, thereby causing binding between the bearing and guide shaft and preventing freedom of movement of the bottom. The result is that the bottom is not sufficiently depressed by the weight of additional fruit delivered to the bin and the fruit overflows, causing considerable loss to the packer by reason of consequent damage to the fruit.

It is an important feature of apparatus embodying the principles of the present invention that the bin bottom is effectively supported in such manner as to provide for ready depressibility under all conditions by eliminating the use of guide shafts and bearings, and providing a supporting means for yieldably supporting the bottom, which is of such character that the bottom is uniformly elevated and depressed irrespective of inequalities in the distribution of weight, and binding or sticking of the parts if absolutely precluded.

Another important feature of the invention resides in the driving means for rotating the bin, which construction embodies numerous advantages over driving mechanisms heretofore utilized, which have invariably, as far as I am aware, been designed to impart continuous rotation to the bins, which could not be controlled in any manner independently of such driving mechanism.

The construction of the novel drive means embodying this invention is designed to permit an operator to exercise a certain amount of control over the rotation of the bin, independently of the driving means which rotates the bin by intermittently applied impulses, as distinguished from a continuously applied rotative force. It is consequently possible for the operator to rotate the bin manually either forwardly or backwardly between impulses and thereby either accelerate or prevent rotation.

This flexibility becomes of decided advantage in certain instances as for example, should the operator's clothing become entangled with the bin or should his person become wedged between the rotating bin and adjacent structure, he can prevent further rotation, or even rotate the bin backwards and thus extricate himself before an injury is suffered.

Another situation wherein independent manual control of the bin becomes important is when only a small amount of fruit is contained therein and it is desired to hasten its rotation to bring fruit within reach of the operator. By my construction this can easily be done, thus avoiding delays which frequently occur in the operation of previously known devices.

Other advantages of the drive mechanism are that any number of bins may readily be connected together for simultaneous operation thereby providing for flexible capacity, and, moreover, provision may be made for driving certain bins at different speeds from the others where desired without the necessity of replacing or interchanging parts.

The manifold objects of the invention will undoubtedly be apparent from the foregoing discussion but certain of the more important objects will be enumerated.

It is an object of the invention to provide a rotary packing bin having a depressible bottom so supported that it may be freely and uniformly elevated and depressed irrespective of inequalities of weight distributed thereon.

Another object is to provide a rotary packing bin with a self-adjusting, depressible bottom so constructed as to be independent of shafts or bearings which, due to unequal distribution of weight in the bin, might bind or stick, thereby preventing proper operation.

It is also an object of my invention to provide a driving means for a rotary packing bin which will enable an operator to accelerate or prevent rotation of the bin independently of the drive means.

It is a further object to provide a driving mechanism for a series of rotary bins by means of which the rotation of any one of said bins may be prevented or accelerated independently of the drive means and without affecting the operation of the remaining bins of the series.

Another object is to provide a driving means for a series of rotary packing bins which will readily permit the incorporation of additional units to the apparatus without the necessity of replacing existing parts.

With the above mentioned objects and advantages in view, as well as numerous others not enumerated, the invention resides in the novel construction and combination of parts hereinafter described, illustrated in the accompanying drawings, and set forth in the claims hereto appended, it being understood that various changes and modifications may be resorted to without departing from the spirit or scope of the invention, and I deem myself entitled to all such changes and modifications as fall within the scope of the claims hereto appended.

Referring to the drawings, wherein like reference characters denote like parts throughout the several views;

Figure 1 is a plan view of a fruit sizing apparatus illustrating the use therewith of a series of rotary bins and drive mechanism therefor embodying my invention.

Figure 2 is a sectional view taken along the line 2—2 of Figure 1, and drawn to a somewhat larger scale.

Figure 5 is a sectional view taken along the line 5—5 of Figure 2 and illustrating a portion of the driving means for rotating the packing bin.

Figure 6 is a side view of one of the curved wedges which support the depressible bin bottom.

Figure 3:
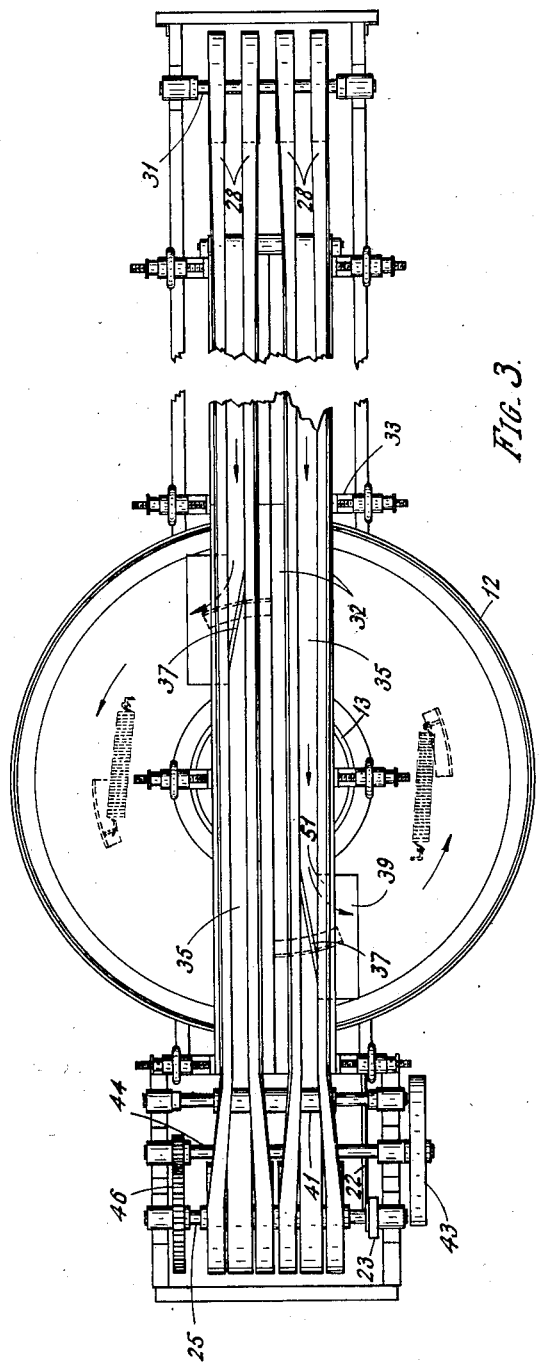
Figure 3 is a large scale plan view of a portion of the apparatus shown in Figure 1, illustrating in detail one of the packing units and the sizing elements.

As one of the important uses of my invention is in conjunction with fruit sizing apparatus, I have so illustrated it in the drawings which disclose such an apparatus in which there are three units, each including a rotary packing bin adapted to receive fruit from a corresponding section of sizing means. As will be understood, however, any number of units may be added as increased capacity is required. The description of one unit will suffice for all, since all units are of identical construction.

Figure 4:
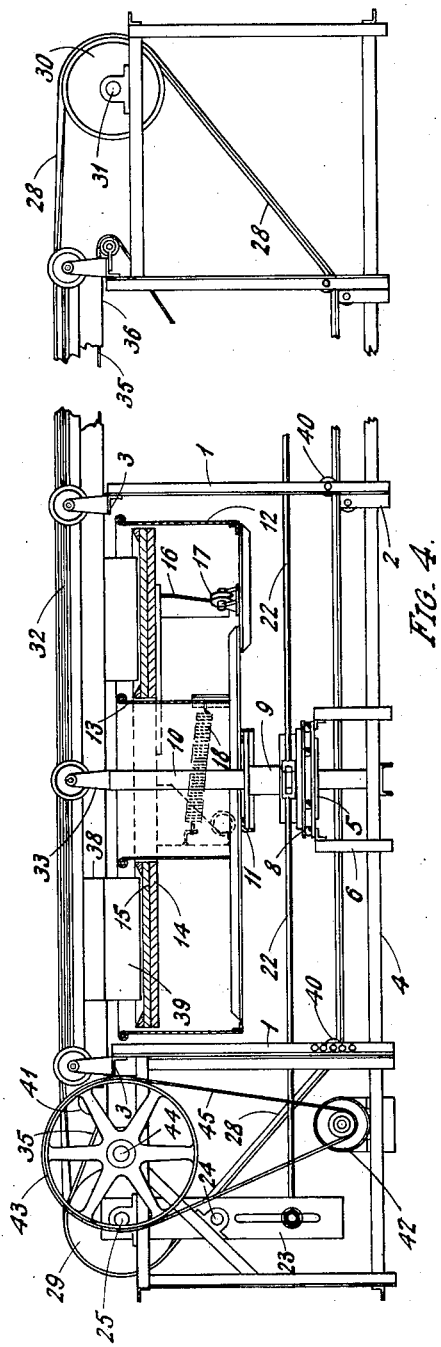
Figure 4 is a side elevation of the apparatus illustrated in Figure 3, together with the driving means therefor, the packing bin being shown in section.

As best illustrated in Figures 2, 3, and 4, each dispensing unit includes a frame having the corner supporting members 1 at one end and the shorter corner supporting members 2 at the other, being held in place by the transverse members 3 and longitudinal stringer members 4. Located centrally of the frame is a pedestal 5, supported by legs 6 and provided with a raceway for the antifriction bearings 7 upon which rests the rotatable hub 8. The hub 8 is provided with an upwardly projecting sleeve or bearing 9 through which passes the stationary vertical shaft 10, about which the hub is adapted to rotate. The top end of the bearing 9 supports a seat 11, upon which rests a circular bin having an outer peripheral wall 12, an inner concentric wall 13, and a bottom 14, which is preferably padded as at 15 in order to minimize danger of bruising the fruit.

It will be noted that the bottom 14 is vertically yieldable. This is accomplished by means of a plurality of arcuate wedge shaped bearing members 16 secured to its underside and adapted to rest upon corresponding grooved rollers 17 carried by the cross-members which support the outer and inner walls of the bin. So that the inclined portion of the wedges may properly cooperate with the grooves in the rollers 17, they are of curved configuration, as shown. Springs 18 are secured to the inner side of the wall 12 and have their opposite ends attached to the wedges 16 and thus serve to urge the bottom 14 upwardly. The limit of upward movement is determined by the vertical portions 16a of the inclined edges of the wedges 16.

By this construction the springs 18 exert their full force in all positions, and as the bottom 14 is depressed by the accumulation of fruit thereon it takes on a combined rotary and vertical movement and its descent is uniform on all sides regardless of inequalities of distribution of fruit upon its top surface. This is assured by the substantially horizontal pull exerted by the springs 18 which maintains the inclined face of each wedge 16 against its supporting roller at all times. Such construction insures that the contents of the bin will not overflow in case fruit is deposited therein more rapidly than it is removed, and because of the fact that the bin bottom is not mounted on any shaft nor dependent upon the operation of bearings there is no danger of binding of parts that might otherwise cause the bottom to tip or bind, which might interfere with its operation.

The driving mechanism for rotating the bin includes a releasable friction clutch comprising a friction band 19 encircling the hub 8 and attached at one end to the outer portion of an arm 20 loosely journaled at its inner end on the bearing 9. The opposite end of the band 19 is pivotally attached to one end of a bell crank 21, pivoted to the underside of the arm 20. The bell crank is oscillated by means of one of the rods 22. The bell cranks associated with the several packing units are connected together by these rods 22, which cause the packing bins to be operated in unison. The rod at the driving end of the apparatus is actuated by a walking beam 23, pivoted at 24, and driven by an eccentric portion of the shaft 25. It will be seen that as the rod 22 is urged to the right the shifting of the bell crank 21 will tighten the band 19 about the hub 8 until the friction causes the hub to rotate, thus rotating the bearing 9 and the entire bin structure supported thereon. Since the bins are interconnected by the several rods 22 they are all caused to rotate simultaneously, and the various bins may be rotated at different speeds, if desired, by attaching the rods 22 to different holes 26 in the arms 21. When the rods start on their return movement towards the left, the band 19 is loosened so that it merely slips on the hub without sufficient friction to turn it. A stop 27 is provided for engagement with the inner end of the bell crank 21 to limit its movement and cause the return of the arm 20 to its original position. As the rods 22 are reciprocated a series of successive rotative impulses are imparted to the bins causing them to rotate continuously under their rotative momentum unless manually restrained as shortly to be described, and thus the fruit in the bins is slowly carried before the packers.

By reason of the above described construction it will be seen that the operator may accelerate or retard the rotation of a single packing bin whenever desired, independently of the drive mechanism or the other bins. At the moment the rods 22 start their return movement towards the left the operator may, by grasping the rim of the peripheral wall 12, stop the rotation of the bin or even cause it to turn backwards until the rods again begin their forward movement. Thus, should the person or clothing of an operator be caught between the bin and the sizing elements or an adjacent bin, the rotation of the offending bin may be immediately stopped and the bin caused to rotate in the opposite direction for a space of time sufficient to release the operator therefrom. On the other hand, should the operator desire to accelerate the rotation of a bin to bring fruit within reach he can do so by manually rotating the bin faster than it would ordinarily rotate between impulses, thus avoiding the delay of waiting until the bin would bring fruit within reach under regular operation.

The construction of the driving mechanism also provides for the addition of units to the apparatus without the necessity of replacing existing parts. As may be seen, any number of packing units may be placed in end to end relation so as to give the desired capacity. The driving mechanism is extended to cause the timed rotation of the additional packing bins with the existing apparatus by merely connecting each new section of rod 22 to the preceding rod, the connection being made at the junction with the bell crank 21.

The particular construction of the sizing mechanism per se, in connection with which the bins are illustrated, forms no part of the present invention except insofar as it may be combined therewith. Other types of sizing mechanisms may be utilized as will be apparent. A brief description of the sizing mechanism disclosed will serve to make clear its construction and operation.

Two pairs of longitudinally divergent endless belts 28 are provided, having their faces angularly disposed so as to form a pair of open bottomed troughs as best seen in Figure 2. These belts are trained over pulleys 29 and 30 carried by shafts 25 and 31 at opposite ends of the machine, and are supported and guided by means of longitudinally extending guides 32 which are, in turn, supported by brackets 33 secured at intervals to the cross members 3 of the frame work and to upwardly projecting extensions of the shafts 10. The inner guides are stationary and fixed to the brackets, while the outer guides are supported by adjustable mountings 34 on each bracket whereby they can be moved relative to the inner guides so as to vary the distance between them. As will be understood by those familiar with fruit sizer construction, the outer guides are set in such position that the belts 28 diverge from one end of the machine to the other so that pieces of fruit deposited between the belts will be carried along thereby until the belts have diverged sufficiently to release them at various points according to their respective sizes.

Endless carrier belts 35 are arranged below the sizing belts 28 to operate in the bottoms of longitudinal troughs 36 supported by the brackets 33 and serve to receive the pieces of fruit as they are released from the sizing belts and carry them along until they are swept therefrom by the diverting strips 37 angularly arranged above the belts 35 adjacent discharge openings 38 in the outer walls of the troughs 36. The pieces of fruit pass over the flexible ramps 39 into their proper bin.

The carrier belts 35 are operated by pulleys secured to the shaft 25 similar to the pulleys 29 and their lower reaches pass beneath rollers 40 journaled in the framework in the same manner as do the sizing belts 28. A roller 41 serves to maintain the upper reaches of the carrier belts in the proper horizontal plane.

The entire apparatus is driven by means of an electric motor 42 which drives a pulley 43 on the shaft 44 by means of a belt 45. The shaft 25 is driven from the shaft 44 by means of gears 46.

It is believed that the construction and operation of the apparatus will now be apparent. The friut to be sized is deposited upon the sizing belts at "A" and is carried thereby until the divergence of the belts allows it to drop through onto the carrier belt beneath from which it is deflected over the ramps 39 into the several bins which are slowly rotated so as to pass the fruit before the packers. As the fruit accumulates in each bin, the bottom is correspondingly depressed so as to maintain the fruit at a given level. By reason of the novel construction of the supporting means the bin bottom descends uniformly regardless of unequal weight distribution thereon. It is impossible for the bottom to tip, since the springs 18 act always in a substantially horizontal plane and, as the shape of the wedges 16 causes a relative rotation of the bin bottom during its descent, the wedges are held against the guide rollers 17 and tipping is thus prevented and uniform descent assured.

As heretofore explained, the operation of the intermittently actuated driving mechanism for rotating the bins is such that in case it is desired any bin or bins may be prevented from rotating or rotation may be accelerated. Moreover, the various bins may be operated normally at various speeds if desired.

Although, for the purpose of this disclosure, the invention has been described as particularly suitable for handling fruit, it will be understood that its use is not in any manner confined thereto but may be extended to many other articles as well.

Having now described my invention and in what manner the same may be used, what I claim as new and desire to protect by Letters Patent is:

1. In a packing bin having a depressible bottom, bearing members associated with said bottom and having inclined bearing surfaces, supporting means upon which rest the inclined surfaces of said bearing members, and resilient means for urging the bearing members against the supporting means.

2. In a circular bin having a depressible bottom, bearing members associated with said bottom at spaced locations therearound, said bearing members having inclined bearing surfaces, supporting means upon which rest the inclined surfaces of said bearing members, and resilient means for maintaining the bearing members against the supporting means to urge the bottom to elevated position.

3. In a circular bin having a depressible bottom, bearing members associated with said bottom and having inclined bearing surfaces, supporting means upon which rest the inclined surfaces of said bearing members, and substantially horizontally acting resilient means for maintaining the bearing members against the supporting means to urge the bottom to elevated position.

4. In a circular bin having a depressible bottom, arcuate bearing members associated with said bottom and having inclined bearing surfaces, supporting means provided with grooves for supporting and guiding the inclined surfaces of said bearing members, and resilient means for resisting relative rotary movement between the bearing members and their supporting means and for urging the bottom to elevated position against the weight of material in the bin.

5. In a circular bin having a depressible bottom, wedge shaped means projecting downwardly from said bottom for up and down movement therewith, means for receiving the inclined faces of said wedges and directing their up and down movement, and resilient means for urging said wedges horizontally against said receiving means to urge the bottom into elevated position.

6. In a circular bin having a depressible bottom, bearing members projecting downwardly from said bottom at spaced locations therearound said bearing members having inclined bearing surfaces, supporting means upon which rest the inclined surfaces of said bearing members, and resilient means for maintaining the bearing members against the supporting means to urge the bottom to elevated position, said bearing members being provided with stop means for cooperation with said supporting means to determine the maximum elevation of the bin bottom.

7. In combination with a freely rotatable dispensing bin, power means operable to impart intermittent rotative impulses thereto in one direction, said power means being releasable during intervals between the application of said intermittent rotative impulses whereby to free the bin and permit either continued forward rotation thereof under its rotative momentum or manual acceleration or retardation of said bin as desired, and means for actuating said power means.

8. In combination with a freely rotatable dispensing bin, means for applying intermittent rotative impulses to said bin to impart a substantially continuous rotation thereto, said means including a reciprocable driving element, means associated with said driving element for engaging and turning the bin when said driving element is moved in one direction, said last named means being releasable when the driving element is moved in the other direction whereby to free the bin for continuous forward rotation thereof under its rotative momentum, and means for reciprocating said driving element.

9. In combination with a rotary dispensing bin, a rotatable support therefor, means for rotating the bin including a reciprocable driving element, a releasable clutch mechanism associated with said support and driving element, said clutch mechanism being operative to engage and turn the supporting element and associated bin only when moved in one direction and to release said supporting element to free the bin for continued forward rotation thereof under its rotative momentum when said clutch mechanism is moved in the other direction, said supporting element and associated bin being freely rotatable during said last mentioned movement of said clutch mechanism, and means for reciprocating the driving element.

10. In combination with a rotary dispensing bin, a freely rotatable support therefor, a friction clutch associated with said support and including a friction band, means for contracting said band when moved in one direction to cause it to bind upon said support and rotate the same and to expand said band when moved in the other direction so as to release the support for free movement thereof whereby the bin may continue its forward rotation under its rotative momentum, and means for oscillating said band.

11. In combination with a plurality of rotary dispensing bins, means for rotating said bins, means interconnecting said bins to cause them to be driven simultaneously and means for adjusting said connecting means to vary the speed of certain of said bins independently of the others.

12. In combination with a plurality of rotary dispensing bins, driving means associated with each bin for rotating the same only when moved forwardly, said driving means being releasable when moved rearwardly to free the bin for continued forward rotation, means interconnecting the several driving means for simultaneous operation, means for oscillating the driving means, and means for varying the stroke of certain of said driving means independently of the others.

ALBERT R. THOMPSON.